United States Patent [19]
Poreh et al.

[11] Patent Number: 6,040,832
[45] Date of Patent: Mar. 21, 2000

[54] APPARATUS FOR AND METHOD OF ACQUIRING, PROCESSING AND ROUTING DATA CONTAINED IN A GUI WINDOW

[75] Inventors: Illan Poreh, Havazelet-Hasharon; Avner Algom, Tel Aviv; Alexander Vaindiner, Or Akiva; Ilya Shpilberg, Netanya, all of Israel

[73] Assignee: AnySoft Ltd., Herzlia, Israel

[21] Appl. No.: 09/132,163

[22] Filed: Aug. 10, 1998

Related U.S. Application Data

[62] Division of application No. 08/540,530, Oct. 10, 1995.

[51] Int. Cl.[7] .................................................. G06F 17/00
[52] U.S. Cl. .......................................... 345/340; 345/346
[58] Field of Search .................................... 345/340, 346, 345/333, 341–342, 343, 348–349, 344–345, 352–353, 347, 329, 330, 331, 332, 145–146, 334, 335, 336, 337, 338, 339; 707/503, 509, 507

[56] References Cited

U.S. PATENT DOCUMENTS

| | | |
|---|---|---|
| 5,313,581 | 5/1994 | Giokes et al. . |
| 5,392,386 | 2/1995 | Chalas . |
| 5,432,932 | 7/1995 | Chen et al. ............................ 395/650 |
| 5,438,661 | 8/1995 | Ogawa . |
| 5,555,369 | 9/1996 | Menendez et al. . |
| 5,579,469 | 11/1996 | Pike . |
| 5,590,266 | 12/1996 | Carson et al. . |
| 5,596,697 | 1/1997 | Foster et al. . |
| 5,596,702 | 1/1997 | Stucka et al. . |
| 5,598,524 | 1/1997 | Johnston, Jr. et al. . |
| 5,606,674 | 2/1997 | Root . |
| 5,619,637 | 4/1997 | Henshaw et al. . |
| 5,621,878 | 4/1997 | Owens et al. . |
| 5,623,679 | 4/1997 | Rivette et al. ........................... 395/788 |
| 5,623,681 | 4/1997 | Rivette et al. ........................... 395/788 |
| 5,625,809 | 4/1997 | Dysart et al. . |
| 5,634,095 | 5/1997 | Wang et al. . |
| 5,638,505 | 6/1997 | Hemenway et al. . |
| 5,680,151 | 10/1997 | Grimm et al. . |
| 5,689,415 | 11/1997 | Calotychos et al. ..................... 364/172 |
| 5,694,544 | 12/1997 | Tanigawa et al. . |
| 5,694,561 | 12/1997 | Malamud et al. . |
| 5,715,416 | 2/1998 | Baker ..................................... 345/349 |
| 5,799,325 | 8/1998 | Rivette et al. ........................... 707/500 |
| 5,809,318 | 9/1998 | Rivette et al. ........................... 395/773 |
| 5,881,381 | 3/1999 | Yamashita et al. ...................... 707/509 |

*Primary Examiner*—Steven Sax
*Attorney, Agent, or Firm*—Paul J. Sutton

[57] ABSTRACT

An apparatus for and method of acquiring, processing and routing data contained in a graphical user interface window. The data contained in a window selected by the user is captured by an acquisition unit and stored in a data buffer. The data, whether string data or bitmapped graphics data, is stored in the data buffer in standard graphical user interface text and/or bitmapped format. A user may designate a portion of the acquired data to be processed by a processor. The processor may utilize one or more processing components to add functionality to an application associated with the graphical user interface window selected by the user. The processed data is then routed to one or more output devices. Output devices may include, for example, files, printers, windows, electronic mail services and operating system temporary buffers. Also disclosed is a method of retrieving the handle of a window from its device context.

26 Claims, 7 Drawing Sheets

```
HWND _exportFAR PASCAL WindowFromDC(HDC hdc)

{ static   HWND   hwnd;
static   DWORD  dw,dw1;
static   POINT  pt,pt1,ptDC,ptWnd;
static   RECT   re;

dw = GetDCOrg(hdc);
        pt.x = LOWORD(dw);
        pt.y = HIWORD(dw);
        if (pt.x < 0) pt.x = 0;
        if (pt.y < 0) pt.y = 0;

_asm

{

DB    0x66;
        DB    0X60;
        } hwnd = WindowFromPoint(pt);

_asm

{

DB    0x66;
        DB    0x61;
        } return  hwnd;

APPARATUS FOR AND METHOD OF ACQUIRING, PROCESSING AND ROUTING DATA CONTAINED IN A GUI WINDOW

This is a division of application Ser. No. 08/540,530 filed on Oct. 10, 1995 pending.

FIELD OF THE INVENTION

The present invention relates to an apparatus for and a method of acquiring, processing and routing data contained in a Graphical User Interface (GUI) window.

BACKGROUND OF THE INVENTION

Recently, GUI operating systems have become more and more the standard user front end computing environment in which to work. The majority of computer system users today work on computers running some type of GUI operating system such as Windows and Windows 95, manufactured by Microsoft Corp., Redmond, Wash., the Apple MAC operating system, manufactured by Apple Corp., Cupertino, Calif., IBM OS/2, manufactured by IBM Corp., Armonk, N.Y., X-Windows for UNIX type operating systems (OS), etc. The majority of these GUI operating systems today incorporate some form of temporary buffering facility, whereby data from one window may be cut or copied to a buffer (i.e. the clipboard in the Windows operating system) and later pasted into another application. The use of this buffer is a simple and effective mechanism of getting data from one application into another, especially when the applications were not designed to work with each other. This mechanism allows applications from different vendors to share data without each knowing about the other. However, for this mechanism to function, the application itself must have been written to include the necessary cut, copy and paste functions for a user to exploit the temporary buffer mechanism (i.e. the clipboard in Windows). Unfortunately, there exist many applications that do not incorporate this mechanism to get data out of their window(s) and into the clipboard. Applications such as terminal emulators, data communication programs (i.e. modem and faxing programs), Internet access software, etc., generally do not supply a simple and easy mechanism to get data out of their programs.

Even those applications that do incorporate a cut, copy and paste mechanism to get data into and out of their window(s) suffer from additional disadvantages. Sharing mechanisms, like the clipboard in Windows, do not provide any means of processing the data to be shared once it has been selected or designated by the user. There is no mechanism for any post processing functions such as spell checking or optical character recognition. In addition, users do not have any options in deciding what to do with the data copied into the clipboard. The only thing a user may do with clipboard data is paste it into another application that was written to have the ability to receive clipboard data. No output destination alternatives exist such as outputting the selected data to a file, a printer, electronic mail facility or another window (whether or not the application was written to accept clipboard data).

Screen capture programs, well known in the prior art, offer an alternative to the clipboard for capturing window data, but they too suffer from disadvantages. Screen capture programs operate on the level of screen memory. They allow a user to capture any portion of the actual visible screen without regard to the type of data being displayed. Captured data is by necessity stored as bitmapped graphics data. It is impossible to capture a text portion of a screen corresponding to, for example, a word processor and store the captured data as text or string data. Screen capture programs suffer from not being able to store the data they capture in the data's native format.

Hereinafter, the term output device is defined as any hardware device, file, software application or other receptacle, existing either in hardware or software, that is able to receive data.

SUMMARY OF THE INVENTION

Thus, there is a long felt need for a device that would allow a user, working in a GUI windows environment, to capture data, in standard GUI format, including both text and bitmapped graphics formats, process it according to the user's commands and be able to output it to one or more output devices.

There is therefore provided, in accordance with a preferred embodiment of the present invention, a graphical user interface window data processing system, the system including acquisition means for capturing data, in standard graphical user interface format, from a graphical user interface window, the acquisition means storing the data, in standard graphical user interface format, in a data buffer, a processor for processing data stored in the data buffer, and a router for transmitting the data processed by the processor, to at least one output device.

Further in accordance with a preferred embodiment of the present invention, there is provided a graphical user interface window data processing system, the system including acquisition means for capturing data, in standard graphical user interface text and/or bitmapped graphics format, from a graphical user interface window, the acquisition means storing the data, in standard graphical user interface text and/or bitmapped graphics format, in a data buffer, a processor for processing, in accordance with commands issued by a user, a portion of the data, the portion corresponding to an area of the graphical user interface window designated by the user, at least one processing component for adding functional capabilities to an application associated with the graphical user interface window selected by the user and a router for transmitting the data processed by the processor, to at least one output device selected by the user.

There is also provided in accordance with a preferred embodiment of the present invention, a method of processing data contained in a graphical user interface window selected by a user, the method including the steps of acquiring the data, in standard graphical user interface format, from the graphical user interface window selected by the user, storing the data in a data buffer, in standard graphical user interface format, processing the data stored in the data buffer and routing the processed data to at least one output device selected by the user.

Additionally, in accordance with a preferred embodiment of the present invention, there is provided a method of acquiring, processing and routing data contained in a graphical user interface window selected by a user, the method including the steps of acquiring the data, in standard graphical user interface text and/or bitmapped graphics format, from the graphical user interface window selected by the user, storing the data, in standard graphical user interface text and/or bitmapped graphics format, in a data buffer, processing a portion of the data, the portion corresponding to an area of the graphical user interface window designated by the user, and processing the data in accordance with commands received from the user and routing the processed data to at least one output device selected by the user.

There is also provided in accordance with a preferred embodiment of the present invention, a method of acquiring data, in standard graphical user interface format, from a graphical user interface window selected by a user, the method including the steps of installing graphical user interface application programming interface function hooks for redirecting graphical user interface function calls originating from an application associated with the graphical user interface window selected by the user, causing the graphical user interface window selected by the user to be redrawn and intercepting the data, in standard graphical user interface format, a the data is redrawn to the graphical user interface window selected by the user.

Further in accordance with a preferred embodiment of the present invention, there is provided a method of acquiring data, in standard graphical user interface format, from a graphical user interface window selected by a user, the method including the steps of identifying the graphical user interface window selected by the user, installing graphical user interface application programming interface function hooks for redirecting graphical user interface function calls originating from an application associated with the graphical user interface window selected by the user, creating a subclass of the graphical user interface window selected by the user, causing the graphical user interface window selected by the user to be redrawn, intercepting the data, in standard graphical user interface format, as it is redrawn to the graphical user interface window selected by the user, storing the intercepted data in a data buffer, in standard graphical user interface format, and removing the window subclass created during the step of creating.

Still further in accordance with a preferred embodiment of the present invention, there is provided a method of capturing data contained in a previously hooked application programming interface function call, the method including the steps of determining a window handle from a device context associated with the application programming interface function call, comparing whether the handle of the window selected by the user is the window handle obtained during the step of determining, and provided that the handle of the window selected by the user is the window handle obtained during the step of determining, saving the data in a memory buffer.

Further in accordance with a preferred embodiment of the present invention, there is provided a method of capturing data contained in a previously hooked application programming interface function call, called by an application associated with a graphical user interface window selected by a user, the method including the steps of determining a window handle from a device context associated with the application programming interface function call, comparing whether the handle of the window selected by the user is the window handle obtained during the step of determining, provided that the handle of the window selected by the user is the window handle obtained during the step of determining, comparing whether the application programming interface function call is a text application programming interface function call, provided that the application programming interface function call is a text application programming interface function call, saving a text string in a memory buffer, provided that the application programming interface function call is not a text application programming interface function call, saving a bitmap in the memory buffer.

Still further in accordance with a preferred embodiment of the present invention, there is provided a method of capturing data contained in a previously hooked application programming interface function call, called by an application associated with a graphical user interface window selected by a user, the method including the steps of determining a window handle from a device context associated with the application programming interface function call, comparing whether the handle of the window selected by the user is the window handle obtained during the step of determining, provided that the handle of the window selected by the user is the window handle obtained during the step of determining, comparing whether the application programming interface function call is a text application programming interface function call, provided that the application programming interface function call is a text application programming interface function call, saving a text string in a memory buffer, provided that the application programming interface function call is not a text application programming interface function call, saving a bitmap in the memory buffer, removing hooking to the application programming interface function call, making the application programming interface function call, and re-installing hooking to the application programming interface function call.

Further in accordance with a preferred embodiment of the present invention there is provided a method of determining a handle of a graphical user interface window from its device context, the method including the steps of determining a pair of x, y coordinates of the translation origin associated with the device context, and determining the handle of the graphical user interface window using the pair of x, y coordinates.

Still further in accordance with a preferred embodiment of the present invention, the standard graphical user interface format includes text and/or bitmapped graphics formats.

Further in accordance with a preferred embodiment of the present invention, there is also provided a plurality of processing components coupled to the processor, the processing components for adding functional capabilities to an application associated with the graphical user interface window selected by the user.

In accordance with a preferred embodiment of the present invention, the processing components include marking means coupled to the processor, the marking means for providing to the user a means of designating to the system the portion of the selected graphical user interface window to be processed by the processor.

In accordance with yet another preferred embodiment of the present invention, the processing components are selected from the group consisting of mail, document sharing, spell checking, marking, thesaurus, optical character recognition, graphical user interface window customization, bitmapped graphics magnifier, graphing, note generator, image processing, text to speech, faxing object linking and embedding, calculator, internet interface and dictionary.

Further in accordance with a preferred embodiment of the present invention, the at least one output device is selected from the group consisting of a file, a printer, a graphical user interface window, electronic mail, an operating system temporary buffer, a tree database, a document sharing system, a fax and a structured query language database interface.

While the invention has been described with respect to a limited number of embodiments, it will be appreciated that many variations, modifications and other applications of the invention may be made.

BRIEF DESCRIPTION OF THE DRAWINGS

The invention is herein described, by way of example only, with reference to the accompanying drawings, wherein:

FIG. 10 is a source code listing of a function for performing the method illustrated in FIG. 9.

DETAILED DESCRIPTION OF THE INVENTION

The present invention is of an apparatus for and a method of acquiring, processing and routing data contained in a GUI window.

The principles and operation of the present invention may be better understood with reference to the drawings and the accompanying description.

Figure 1:
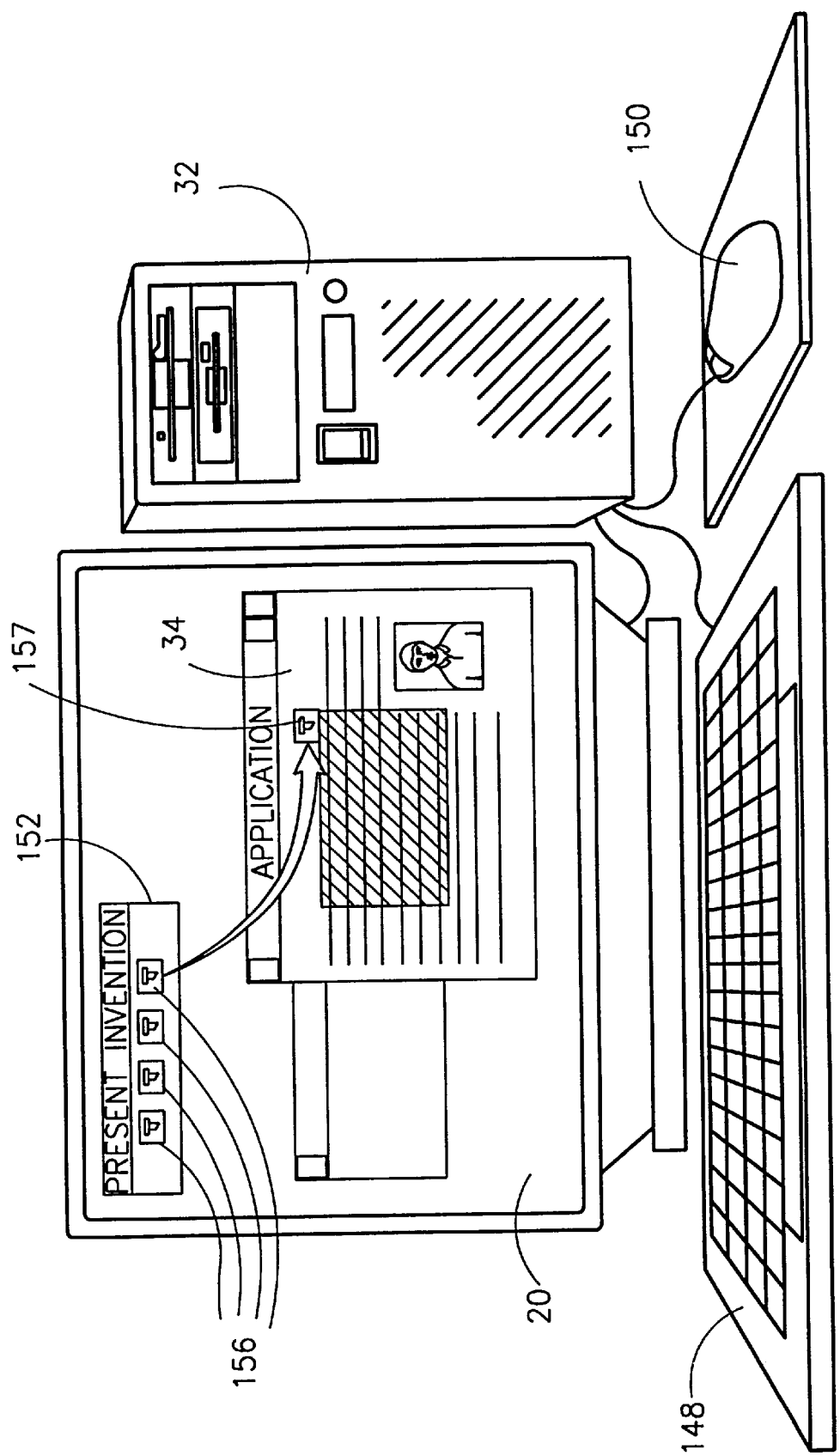
FIG. 1 is a view of the present invention as applied to a GUI windowed environment.

The present invention disclosed herein gives a computer user working in a windowed GUI environment the ability to acquire, process and route data contained in any window visible on the screen, regardless of whether the data is originally 'view only.' An example of the present invention in a typical application is shown in FIG. 1, to which reference is now made.

A typical personal computer (PC) system includes computer 32, mouse 150, keyboard 148 and video display or screen 20. In the example, computer 32 runs a windowed GUI operating system such as Windows, Windows 95 or X-Windows, for example. Shown within display 20 are a window 152 representing an application embodying the present invention and a window 34 associated with another application. The application in window 34 may be any application that is capable of drawing a window on screen 20. Window 152 embodying the present invention contains one or more icons 156 representing different user programmable command configurations.

Any visible window can have its contents captured regardless of the format of the data within. Both text (i.e. string) data and bit mapped graphics data may be captured. To capture data in a window, a user drags one of the visible icons, such as icon 157, from window 152 and drops it in a window selected to be captured, such as window 34, for example. The user then designates the specific area of the window to be processed. Both text data and graphics objects may be highlighted and designated by the user. After the data is selected, it is processed in accordance with the user's commands. Such services as spell checking and graphing, for example, may be accessed in accordance with the actual commands issued by the user. Subsequently the user can elect to route or output the processed data to one or more destinations such as a file, another window or electronic mail services (e-mail), for example.

Figure 2:
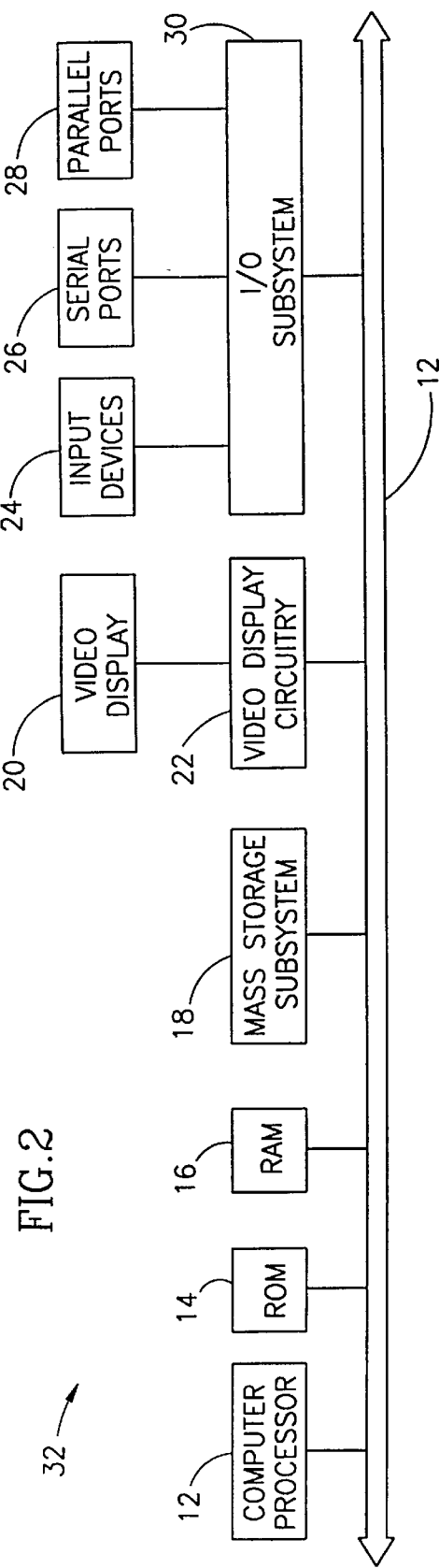
FIG. 2 is a high level block diagram of a computer system wherein the present invention may be employed.

Shown in FIG. 2 is a high level block diagram of a computer system 32 that can operate the present invention. Computer system 32 includes a computer processor 12 coupled to a bus 13. Also coupled to bus 13 are read only memory (ROM) 14, random access memory (RAM) 16, mass storage subsystem 18, video display circuitry 22 and input/output (I/O) subsystem 30. Computer system 32 may be any common PC such as the International Business Machine (IBM) family of PCs. It is intended that the present invention may operate on any suitable computer system, such as the one shown in FIG. 1, that employs a windowed graphical user interface. Computer system 32 has at its core, computer processor 12, which may be any suitable single or multi-processor as found in today's personal computers. ROM 14 contains firmware for computer processor 12. The firmware enables computer 32 to initialize, perform system tests and boot an operating system. RAM 16 provides computer processor 12 with read/writable memory in which to perform calculations and run application programs. Mass storage subsystem 18 provides computer 32 with long term memory storage capabilities for storing system and application related data. Video display circuitry 22 provides computer 32 with the capability of displaying information on video display 20. I/O subsystem 30 provides an interface between computer processor 12 and the outside world. Input devices 24 include keyboards and pointing devices, for example, and are connected to I/O subsystem 30. Pointing devices include mice, trackballs, graphic tablets, etc. Serial ports 26 allow computer system 32 to communicate with serial devices such as modems, serial printers, etc. Parallel ports 28 allow computer system 32 to communicate with parallel devices such as printers. Bus 13 connects the internal components of computer system 32 together and provides an internal means of communications between the components.

Figure 3:
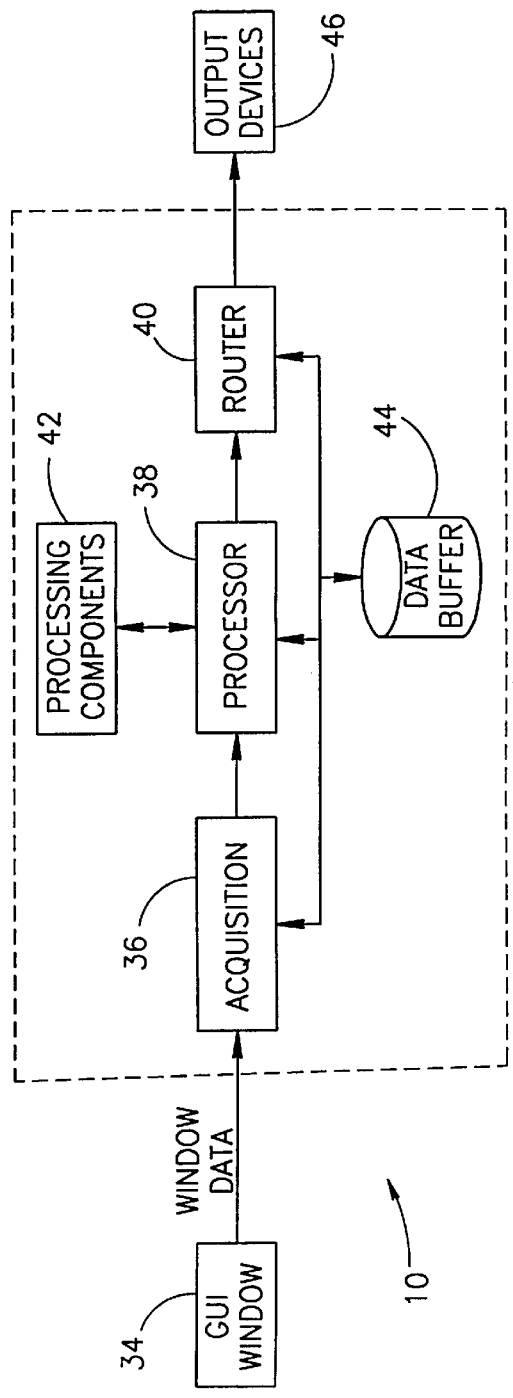
FIG. 3 is a high level block diagram of a preferred embodiment of the present invention.

A preferred embodiment of the present invention is shown in FIG. 3. Device 10 includes an acquisition unit 36 coupled to a processor 38 and a data buffer 44. Processor 38 is coupled to a router 40, processing components 42 and data buffer 44. Router 40 is also coupled to data buffer 44. Data from a GUI window 34 is captured by acquisition unit 36 and stored in data buffer 44. Data buffer 44 may reside wholly or in part either in RAM 16 or in mass storage subsystem 18. Processor 38 functions to process the data stored in data buffer 44. Processing components 42 add functionality to the application associated with the window selected by the user. The functional capabilities furnished by processing components 42 may be provided in the form of software modules. The software modules may be developed independently or purchased from third party software development kit (SDK) vendors. The software modules subsequently are integrated into device 10. Router 40 transmits data processed by processor 38 to one or more output devices 46.

Figure 4:
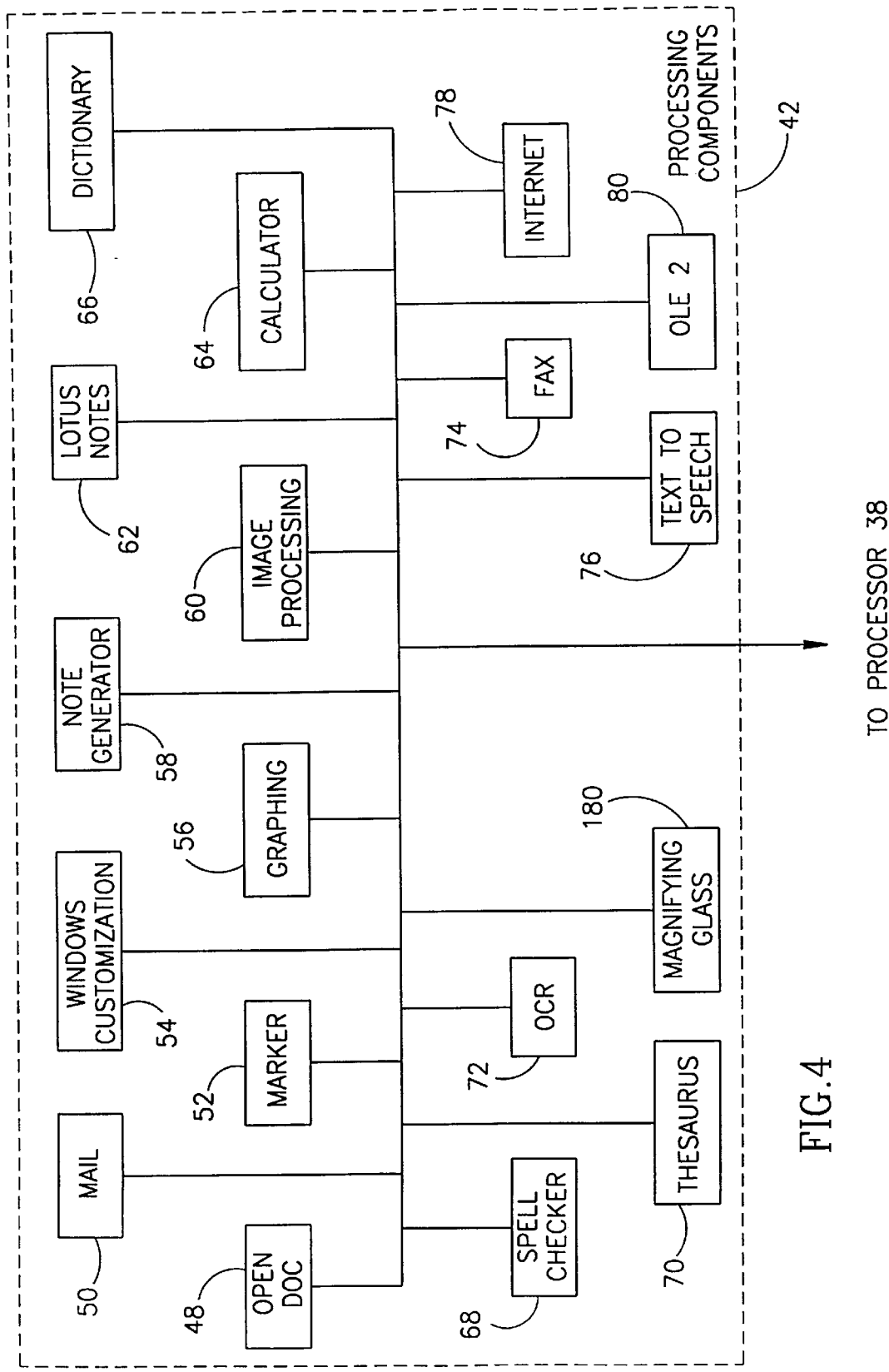
FIG. 4 is a high level block diagram illustrating the functional capabilities included in a preferred embodiment of the present invention.

Device 10 provides numerous services to an application that are not typically available from one software source. In particular, FIG. 4 illustrates possible processing components that may be accessed by an application. An OpenDoc component 48 gives applications the ability to send data contained in a GUI window to OpenDoc applications by simply dragging an OpenDoc icon to a GUI window selected by the user. OpenDoc component 48 gives non OpenDoc applications the ability to utilize OpenDoc functionality. A mail component 50 provides e-mail and related services. Mail services are also available to an application in the form of an output device, as is explained below. A marker component 52 provides the user with a means of designating the portion of the selected window that is to be processed by processor 38. Marker 52 allows the user to select any graphics object that is visible in the window. In addition, marker 52 allows text to be selected either by highlighting the text line by line or by highlighting any rectangular area of the window. A windows customization component 54 allows the user to alter any window attributes of the selected window. A graphing component 56 provides graphing services that allow a user to generate graphs from data highlighted in the selected window. This provides a simple graphing mechanism that reduces the need for a spreadsheet package for those users needing only graphing capabilities. A note generator component 58 provides a user the ability to attach small notes to objects contained in an application window. A note appears on the screen when the cursor passes over its corresponding object. Notes can either remain on the screen or disappear when the cursor moves away from the object, in accordance with the preference of the user. An image processing component 60 provides image manipulation capabilities. Such manipulations include stretching, clipping, zooming, scaling, rotating, etc. A Lotus Notes component 62 gives an application the ability to create new documents, append to existing documents and to access Lotus Notes Mail, manufactured by Lotus Development Corp., Cambridge, Mass., in the Lotus Notes document management system standard. Lotus Notes compatibility is also provided as an output device, explained below. A calculator component 64 provides mathematical manipulation capabilities such as those found on a standard or scientific calculator or in a typical spreadsheet application.

A dictionary component 66 provides the user with an on-line dictionary. A spell checker component 68 provides spell checking services to the user. Any text in the selected window, within the area designated by the user may be spell checked. This service is very useful since many applications do not include any spell checking capabilities. For example, many e-mail applications do not provide a spell check feature. Using device 10, any text located in a window can be spell checked, as long as it is visible. A thesaurus component 70 provides an on-line thesaurus for the user. An optical character recognition (OCR) component 72 provides OCR services. A user can highlight a bit map in a window and have OCR component 72 convert the bit mapped text into string format which can subsequently be edited in a word processor. OCR component 72 also allows facsimiles received directly by a computer to be converted into editable text.

A fax component 74 provides both inbound and outbound faxing services. Highlighted areas designated within a GUI window may be faxed directly without needing to use a separate fax software package. Faxing services are also provided in the form of an output device, explained later. A text-to-speech component 76 allows text selected by the user to be read through a sound card, multimedia board or other audio capable hardware peripheral. An Internet component 78 provides access services to the Internet, a very popular worldwide network. An object linking and embedding 2 (OLE 2) component 80 provides OLE 2 functionality to an application to allow it to send data contained in a GUI window to OLE 2 enabled applications simply by dragging an OLE 2 icon to a GUI window selected by the user. OLE 2 component 80 permits non OLE 2 enabled applications to utilize OLE 2 functionality. For applications that do not support OLE 2, OLE 2 component 80 creates a container window which becomes coupled to the selected application window. OLE 2 server applications can then be accessed and linked to the attached container window. A magnifying glass component 180 gives the user the ability to enlarge any area of a GUI window. The blown up area can be designated and routed to output devices 46.

Processing components 42 may include one or more of the components or modules disclosed above, in any combination. Processor 38 utilizes only those modules provided by processing components 42 that are needed to carry out the commands given by the user. Some modules are activated automatically, such as marker component 52. Once the user selects a GUI window whose data is to be captured, marker component 52 is activated automatically. The user then uses a pointing device to highlight a designated area of the selected window to be processed. The designated area may include the entire contents of the selected window, whether selected by the user pf device 10.

Figure 5:
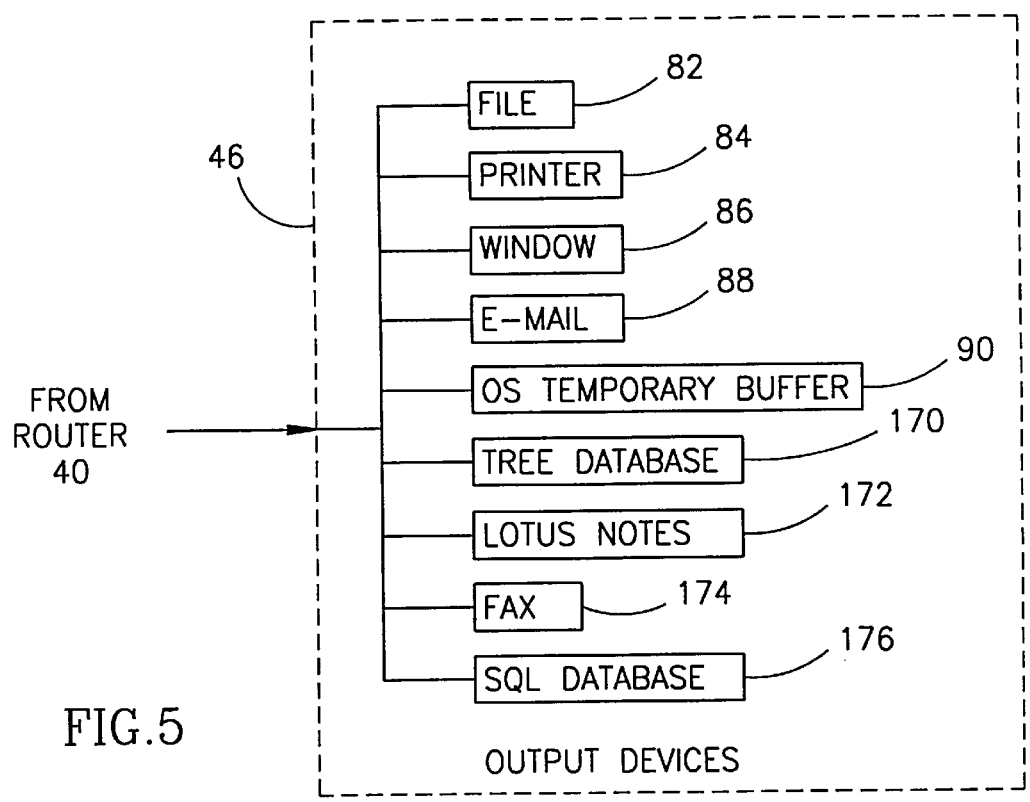
FIG. 5 is a high level block diagram illustrating the output devices utilized by the present invention.

As previously disclosed, router 40 transmits processed data from processor 38 to one or more output devices 46. Shown in FIG. 5 are a number of possible output device options. The user has the option of steering data processed by processor 38 to a file 82. The data can be stored in the file in its native format or the user may choose to convert the data to another format before it is written to the file. For example, data captured from a terminal emulation application may be stored in a particular word processor's format. Data may also be directed to a printer 84. A window 86 may be designated as the recipient of processed data. In this case, data directed to another window is kept in its native format. The user may elect to send processed data to an e-mail output device 88 which forwards the data to an address supplied by the user. An OS temporary buffer 90 receives the processed data and 'parks' it in a buffer. The user may subsequently paste the contents of OS temporary buffer 90 into another application. An example of OS temporary buffer 90, in the Windows operating system, is the clipboard.

A tree database 170 allows designated data to be stored in a file and placed in a hierarchal database defined by the user. The tree database parallels a typical filing system employed by many OSs. A Lotus Notes interface 172 provides functionality similar to that of Lotus Notes component 62 but acts as an output device rather than a processing component. A fax output module 174 provides facsimile functionality similar to that of fax component 74 but allows a user to fax processed data. A structured query language (SQL) database interface 176 allows processed data to be output to SQL databases. SQL database interface 176 also supports databases that adhere to the open database connectivity (ODBC) standard. Any one or more of the output devices 46 disclosed above may be chosen to simultaneously receive processed data from processor 38.

Figure 6:
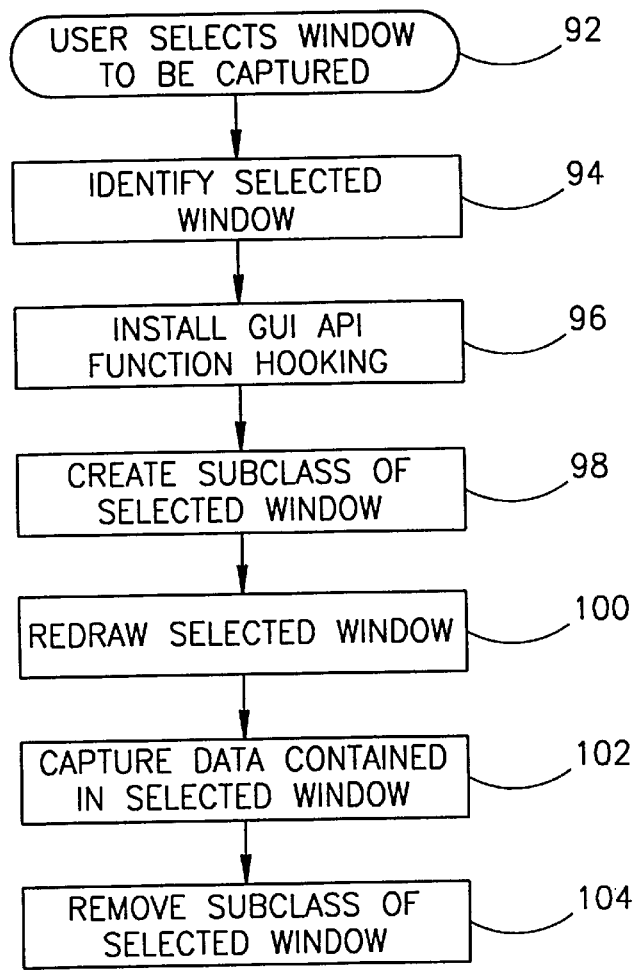
FIG. 6 is a high level flow diagram illustrating the method of acquiring data from a graphical user interface window.

The operation of acquisition unit 36 will now be explained in more detail. Reference is made to FIG. 6 which illustrates the high level process flow of acquisition unit 36. Generally, acquisition unit 36 captures window data by forcing the application associated with the selected GUI window to redraw its window. The GUI function calls made by the application during redrawing are intercepted and the associated window data extracted. Acquisition unit 36 is triggered into operation by a user dragging icon 156 and dropping it into GUI window 34 visible on display 20, as illustrated in FIG. 1 (box 92). First, the identity of the window selected by the user is determined (box 94). A function provided by the GUI is utilized to perform the task of identification. The function returns the handle of the window corresponding to the cursor position point provided as a parameter. In the Windows OS the function used is called WindowFromPoint. This function retrieves the handle of the window in which the cursor point lies.

Hooks are then installed on selected fixed functions in the GUI (box 96). Normally, the GUI application programming interface (API) functions are used by applications to receive services and perform various system related functions. These standard functions may be bypassed by installing GUI API function hooking. The hooking is accomplished by replacing the standard function call addresses with addresses directed to functions provided by device 10. Once API function hooking is installed, an application that calls a standard GUI function will be directed to a function provided by device 10. Hooking, however, is not installed for all GUI API functions. Only the API functions that control the process of GUI drawing are hooked. In a preferred embodiment, hooking is installed for the following Windows OS GUI API functions:

| USER text string API: | |
|---|---|
| TabbedTextOut | writes a tabbed character string |
| Graphic Device Interface (GDI) text string API: | |
| ExtTextOut | writes character strings in a rectangular area |
| GDI bit mapped image APIs: | |
| BitBlt | copies a bitmap between device contexts |
| StretchBlt | copies a bitmap, transforming it if required |
| StretchDIBlt | moves device independent bitmap (DIB) from a source rectangle to a destination rectangle |
| SetDIBits | sets the bits of a bitmap |
| SetDIBitsToDevice | sets bits from a DIB directly on a device surface. |

In Windows, the hooking process is accomplished by replacing the beginning of the API function code operator with a jump (i.e JMP) address that points to a function provided by device 10.

Next, a subclass of the selected window is created (box 98). The purpose of creating a subclass of the selected window is to gain control over the application's window object. In addition, subclassing a window causes its associated data to be replicated, so as to preserve the data contained in the original window. In a preferred embodiment, the SetWindowLong function provided by the Windows OS is utilized to perform the subclassing. An additional reason for subclassing the selected window is to insure that device 10 receives an 'end of drawing' message from the OS when the redrawing of the selected window has completed.

The selected window is then redrawn (box 100). Device 10 forces the selected window's application to redraw its window. This is the basic mechanism that allows acquisition unit 36 to capture window data. In a preferred embodiment, the InvalidateRect and UpdateWindow functions provided by the Windows OS are used to force an application to redraw its window. In Windows, the InvalidateRect function adds a rectangle to a Window's update region. The update region represents the client area of the window that must be redrawn. The invalidated areas accumulate in the update region until the region is processed when the next WM_PAINT message occurs, or until the region is validated. Windows sends a WM_PAINT message to a window whenever its update region is not empty and there are no other messages in the application queue for that window.

The UpdateWindow function updates the client area of the given window by sending a WM_PAINT message to the window if the update region for the window is not empty. The function sends a WM_PAINT message directly to the window procedure of the given window, bypassing the application queue. The WM_PAINT message is received by the application but the subclassed window is redrawn rather than the application's original window.

The data contained in the selected window is redrawn to the display 20 and subsequently captured or intercepted by filter functions provided by device 10 (box 102). These functions were those previously hooked into place in box 96. Calls by the application, to the GUI API functions listed above, are redirected to functions provided by device 10. The functions provided by device 10 subsequently filter the data, as will be described shortly below. The filtered data is stored in data buffer 44 in standard GUI format. Standard GUI format is the format used by the GUI to represent data, such as text and bitmapped graphics. This is in contrast to formats used by individual applications which typically vary from application to application. Different applications may add control characters, for example, to implement functions such as text data formatting, paragraphing, paging, file structure, GUI window presentation, etc. Device 10 stores the data unchanged as it exists as a parameter of the API function call. Both string data and bitmapped graphics are stored in the standard GUI format. This allows, for example, fonts, colors and other attributes of string data to be preserved.

After the selected window's application has completed redrawing its window, the windows subclass created in box 98 is removed and the application's original window is restored (box 104). The data captured and stored in data buffer 44 is then processed by processor 38. The GUI API function hooking installed during step 96 is not removed, however, until the user exits the software provided by device 10. At that point, pointers to the original GUI API functions are restored.

Figure 7:
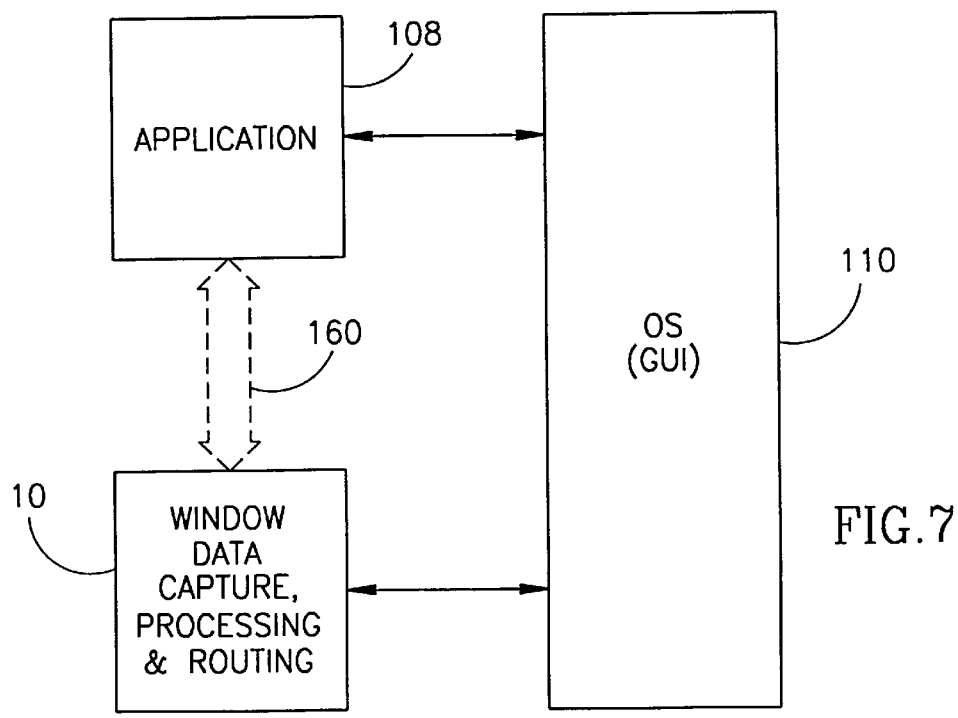
FIG. 7 is a high level block diagram illustrating the relationship between the present invention, a selected application and the operating system.

A better understanding of the operation of acquisition unit 36 may be made by referring to FIG. 7, which illustrates the relationship between an application 108, device 10 and GUI OS 110. As previously mentioned, application 108 normally makes GUI API functions calls to OS 110. Device 10 replaces these standard calls with its own functions. The effect is to route calls made by application 108 to the API functions listed above to functions provided by device 10. Once hooking is installed, device 10 receives the data associated with these API function calls. A pseudo data 'link' is thereby established as symbolized by arrow 160.

Figure 8:
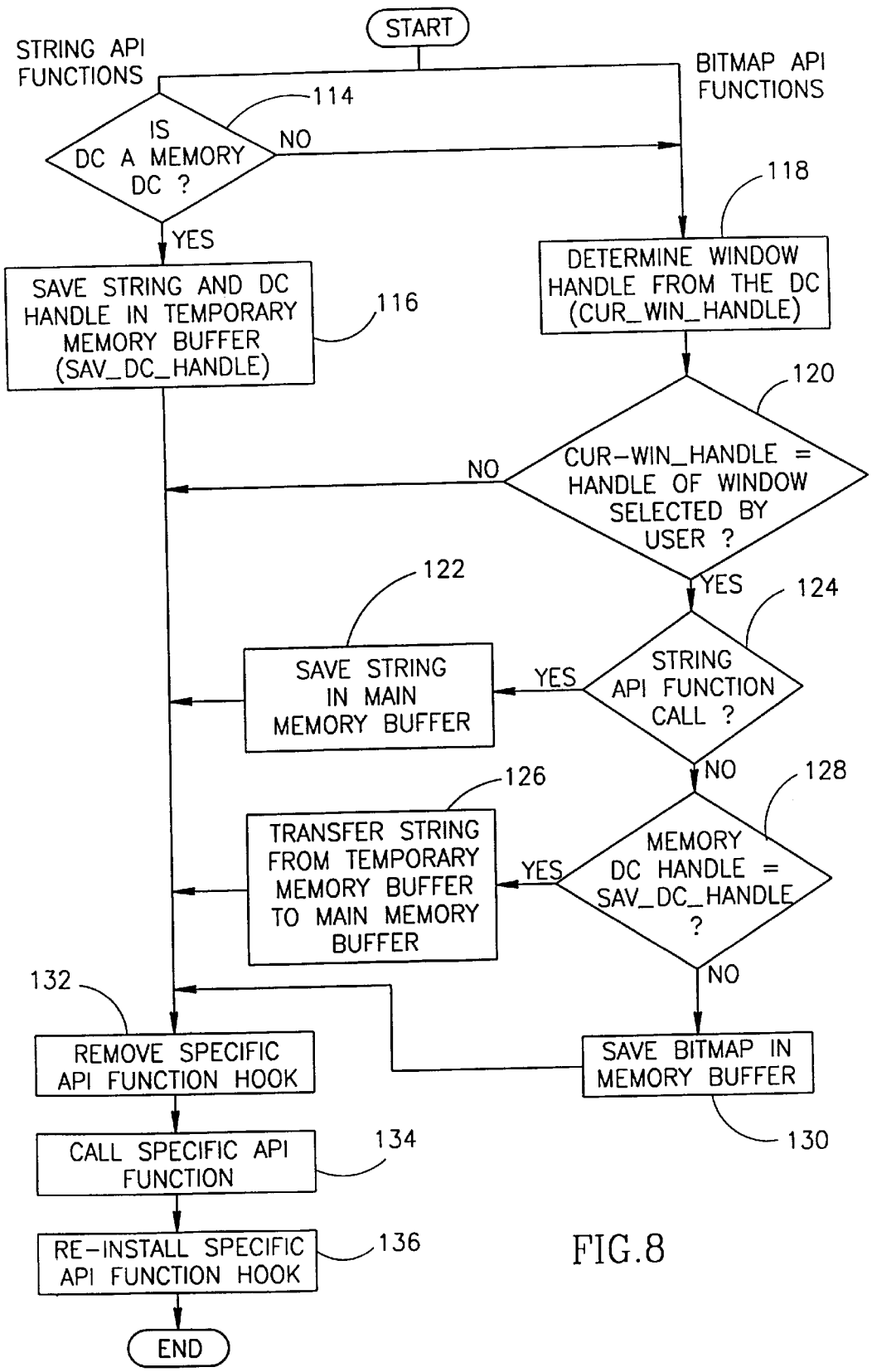
FIG. 8 is a high level flow diagram illustrating, in more detail, the process of capturing data contained in a graphical user interface window as it is redrawn.

A flow diagram showing box 102 (in FIG. 6) in more detail is illustrated in FIG. 8. In a preferred embodiment, the string API functions are redirected to decision box 114.

The Windows string APIs include the USER text string API TabbedTextOut and the GDI text string API ExtTextOut. The bitmapped API functions are redirected to box 118. The Windows bitmapped APIs include the GDI bit-mapped APIs BitBlt, StretchBlt, StretchDIBlt, SetDIBits and SetDIBitsToDevice. Decision box 114 is necessary in order to handle those applications that first write string data to a temporary storage area and later cause the contents of the temporary storage area to be written to the display. It is first determined whether the device context (DC), received as a parameter to the function call, is a memory DC (decision box 114). If the DC is a memory DC then the string and the DC handle (SAV_DC_HANDLE) are saved in a temporary memory buffer (box 116). If the DC is not a memory DC than control is passed to box 118.

Figure 9:
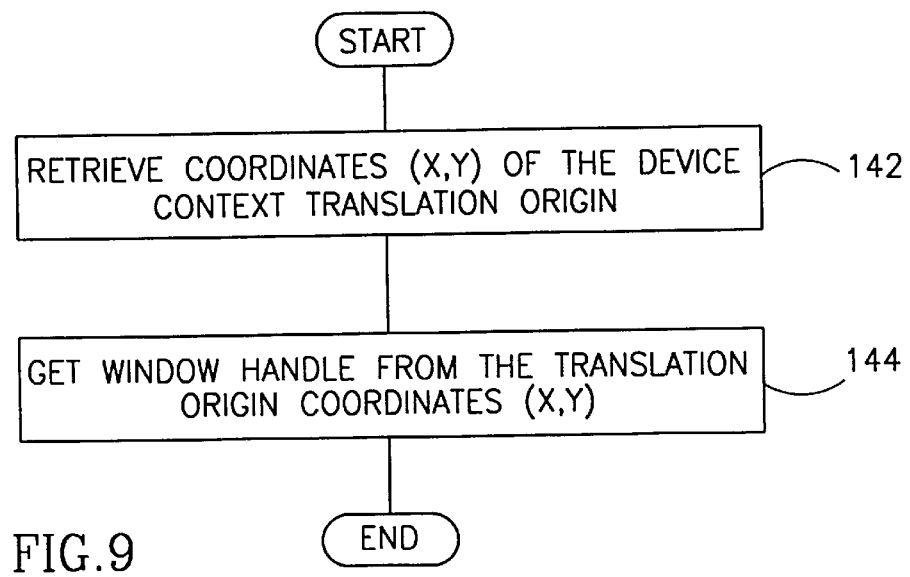
FIG. 9 is a high level flow diagram illustrating the method of determining the window coordinates from a device context.

For all redirected bitmapped API functions and non memory DC string API functions the window handle (CUR_WIN_HANDLE) corresponding to the DC, passed as a parameter to the function, is determined (box 118). In the case of the Windows OS, there does not exist a built in function that returns the window handle corresponding to a DC. Device 10 includes a mechanism to derive a window handle from the DC which is illustrated in FIG. 9. First, the coordinates (x, y) of the final translation origin for the DC are retrieved (box 142). In a preferred embodiment, the GetDCOrg function provided by the Windows OS is used. The translation origin retrieved specifies the offset used by the Windows OS to translate device coordinates into client coordinates for points in an application's windows. The final translation origin is relative to the physical origin of the display 20.

Next, the window handle is determined from the translation origin coordinates (x, y). In a preferred embodiment, the WindowFromPoint function provided by the Windows OS is utilized (box 144). As previously described, the WindowFromPoint function retrieves the handle of the window that contains the specified point.

A source code listing is shown in FIG. 10 for a function that embodies the method illustrated in FIG. 9. The function WindowFromDC is written in the C++ programming language and is intended to be run within the Windows OS. The assembler sections within the function, prefaced by '_asm', are needed for the function to operate correctly with the Microsoft DOS operating system.

Referring to FIG. 8, after CUR_WIN_HANDLE is determined (box 118) it is compared to the handle of the window selected by the user. (decision box 120). If the two window handles match, it is then determined whether the original API function call was actually a string API function call (decision box 124). If it was, the string is saved in the main memory buffer (box 122). If the original API function call was not a string API function call, it is then determined whether any of the memory DC handles stored in box 116 match the current memory DC handle of the current API function call (decision box 128). If a match is found, the string is transferred from the temporary memory buffer to the main memory buffer (box 126). Both the string and its attributes are transferred. Decision box 128 and box 126 are needed to cover those applications that write strings to a temporary memory buffer first and then, at a later time, call a bitmapped API function to write the contents of the buffer to the screen. If no match is found, than by default the data is a bitmap and it is saved in the main memory buffer (box 130).

In all cases, the following steps are performed before exiting. First, the specific API function hook, for the currently redirected function only, is temporarily removed (box 132). This is to allow the original GUI API function to be called and actually perform the string or bitmap function call issued by the application (box 134). At this point, the data associated with the specific API function has been filtered and stored in a memory buffer. After the call to the GUI API function returns, hooking is reinstalled for the specific API function that was originally called (box 136). This step (box 136) restores the hooking to the state it was in when box 102 was first entered into.

As mentioned, acquisition unit 36 is operative upon the user dropping icon 156 into user selected window 34. Once the data within window 34 has been acquired, the user can designate a portion of selected window 34 to be processed. Marker component 52 is utilized to provide the user with a means of designating portions of selected window 34 to be processed. Once designated, the data is passed to processor 38 which executes the commands given by the user. Depending on the user's commands, various processing components 42 may be invoked to provide a variety of services. Following processing, router 40 directs the processed data to one or more output devices 46 chosen by the user to receive the processed data.

While the invention has been described with respect to a limited number of embodiments, it will be appreciated that many variations, modifications and other applications of the invention may be made.

What is claimed is:

1. A graphical user interface window data processing system comprising:

acquisition means associated with a first application program for capturing data in a standard graphical user interface format from a graphical user interface window associated with a second application program, wherein at least a portion of said format comprises a text format, said acquisition means storing said data in said standard graphical user interface format in a data buffer;

a processor for processing said data stored in said data buffer; and a router for transmitting said data processed by said processor to at least one output device.

2. The method of claim 1, wherein said standard graphical user interface format includes a bitmapped graphics format.

3. The system of claim 1, wherein said processor processes said data stored in said buffer in accordance with commands received from a user.

4. The system of claim 1, wherein said processor processes a portion of said data which corresponds to an area of the graphical user interface window designated by a user.

5. The system of claim 1, further comprising a plurality of processing components coupled to said processor, said processing components for adding functional capabilities to an application associated with the graphical user interface window selected by a user.

6. The system of claim 5, wherein said processing components include marking means coupled to said processor, said marking means for providing to the user a means of designating to the system the portion of the selected graphical user interface window to be processed by said processor.

7. The system of claim 5, wherein said processing components are selected from the group consisting of mail, document sharing, spell checking, marking, thesaurus, optical character recognition, graphical user interface window customization, bitmapped graphics magnifier, graphing, note generator, image processing, text to speech, faxing, object linking and embedding, calculator, internet interface and dictionary.

8. The system of claim 1, wherein said at least one output device is selected from the group consisting of a file, a printer, a graphical user interface window, electronic mail, an operating system temporary buffer, a tree database, a document sharing system, a fax and a structured query language database interface.

9. A graphical user interface window data processing system, comprising:

acquisition means associated with a first application program for capturing data in a standard graphical user interface text and/or bitmapped graphics format, from a graphical user interface window associated with a second application program, said acquisition means storing said data in said standard graphical user interface text and/or bitmapped graphics format in a data buffer;

a processor for processing, in accordance with commands issued by a user, a portion of said data, said portion corresponding to an area of the graphical user interface window designated by the user;

at least one processing component associated with said first application program and coupled to said processor, said at least one processing component for adding functional capabilities to an application associated with the graphical user interface window selected by the user; and a router for transmitting said data processed by said processor to at least one output device selected by the user.

10. The system of claim 9, wherein said processing component includes marking means coupled to said processor, said marking means for providing to the user a means of designating to the system the portion of the selected graphical user interface window to be processed by said processor.

11. The system of claim 9, wherein said processing component is selected from the group consisting of mail, document sharing, spell checking, marking, thesaurus, optical character recognition, graphical user interface window customization, bitmapped graphics magnifier, graphing, note generator, image processing, text to speech, faxing, object linking and embedding, calculator, internet interface and dictionary.

12. The system of claim 9, wherein said at least one output device is selected from the group consisting of a file, a printer, a graphical user interface window, electronic mail, an operating system temporary buffer, a tree database, a document sharing system, a fax and a structured query language database interface.

13. A method of processing data contained in a graphical user interface window associated with a first application program and selected by a user, comprising the steps of:

acquiring said data via a second application program in a standard graphical user interface format, from the graphical user interface window selected by the user, wherein at least a portion of said format comprises a text format;

storing said data in a data buffer, in said standard graphical user interface format;

processing said data stored in said data buffer; and routing said processed data to at least one output device selected by the user.

14. The method of claim 13, wherein said standard graphical user interface format includes a bitmapped graphics format.

15. The method of claim 13, wherein said data is processed, during said step of processing, in accordance with commands received from the user.

16. The method of claim 13, wherein said data processed during said step of processing, corresponds to an area of the graphical user interface window designated by the user.

17. The method of claim 13, further comprising the step of providing a plurality of processing components associated with said second application program for adding functional capabilities to an application associated with the graphical user interface window selected by the user.

18. The method of claim 17, wherein said processing components include marking means coupled to said processor, said marking means for providing to the user a means of designating to the system the portion of the selected graphical user interface window to be processed by said processor.

19. The method of claim 17, wherein said processing components are selected from the group consisting of mail, document sharing, spell checking, marking, thesaurus, optical character recognition, graphical user interface window customization, bitmapped graphics magnifier, graphing, note generator, image processing, text to speech, faxing, object linking and embedding, calculator, internet interface and dictionary.

20. The method of claim 13, wherein said at least one output device is selected from the group consisting of a file, a printer, a graphical user interface window, electronic mail, an operating system temporary buffer, a tree database, a document sharing system, a fax and a structured query language database interface.

21. A method of acquiring, processing and routing data contained in a graphical user interface window associated with a first application program and selected by a user, the method comprising the steps of:

acquiring said data via a second application program in a standard graphical user interface text and/or bitmapped graphics format from the graphical user interface window selected by the user;

storing said acquired data in said standard graphical user interface text and/or bitmapped graphics format in a data buffer;

processing a portion of said data via said second application program, said portion corresponding to an area of the graphical user interface window designated by the user, in accordance with commands received from the user; and routing said processed data to at least one output device selected by the user.

22. The method of claim 21, further comprising the step of providing a plurality of processing components associated with said second application program for adding functional capabilities to said first application program associated with the graphical user interface window selected by the user.

23. The method of claim 22, wherein said processing components include marking means for providing to the user a means of designating to the system the portion of the graphical user interface window selected by the user to be processed during step of processing.

24. The method of claim 22, wherein said processing components are selected from the group consisting of mail, document sharing, spell checking, marking, thesaurus, optical character recognition, graphical user interface window customization, bitmapped graphics magnifier, graphing, note generator, image processing, text to speech, faxing, object linking and embedding, calculator, internet interface and dictionary.

25. The method of claim 21, wherein said at least one output device is selected from the group consisting of a file, a printer, a graphical user interface window, electronic mail, an operating system temporary buffer, a tree database, a document sharing system, a fax and a structured query language database interface.

26. The of claim 21, further comprising the step of providing marking means associated with said second application program for providing to the user a means of designating to the system the portion of the selected graphical user interface window to be processed during said step of processing.

* * * * *